US011745753B2

(12) United States Patent
Choi et al.

(10) Patent No.: US 11,745,753 B2
(45) Date of Patent: Sep. 5, 2023

(54) VEHICLE AND METHOD OF CONTROLLING THE SAME

(71) Applicants: Hyundai Motor Company, Seoul (KR); Kia Corporation, Seoul (KR)

(72) Inventors: Sunho Choi, Hwaseong-si (KR); Sang Jae Han, Hwaseong-si (KR); Changseob Lim, Suwon-si (KR); Han Young Park, Anyang-si (KR); Sungtae Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 45 days.

(21) Appl. No.: 17/500,526

(22) Filed: Oct. 13, 2021

(65) Prior Publication Data

US 2022/0135064 A1    May 5, 2022

(30) Foreign Application Priority Data

Nov. 5, 2020  (KR) .................. 10-2020-0146597

(51) Int. Cl.
*B60W 50/14*     (2020.01)
*B60K 35/00*     (2006.01)
*B60L 58/13*     (2019.01)
*B60L 58/16*     (2019.01)
*B60W 10/26*     (2006.01)

(52) U.S. Cl.
CPC ............ *B60W 50/14* (2013.01); *B60K 35/00* (2013.01); *B60L 58/13* (2019.02); *B60L 58/16* (2019.02); *B60W 10/26* (2013.01); *B60K 2370/169* (2019.05); *B60K 2370/178* (2019.05); *B60K 2370/193* (2019.05); *B60W 2050/146* (2013.01); *B60W 2510/244* (2013.01); *B60W 2510/248* (2013.01)

(58) Field of Classification Search
CPC ................ B60W 50/14; B60W 10/26; B60W 2050/146; B60W 2510/244; B60W 2510/248; B60L 58/16; B60L 58/13; B60K 35/00; B60K 2370/178; B60K 2370/169; B60K 2370/193
See application file for complete search history.

(56) References Cited

U.S. PATENT DOCUMENTS 6,215,283 B1 *  4/2001  Desroches ............ H02J 7/1446
                                                        322/14
6,417,668 B1 *  7/2002  Howard ................... H02J 7/14
                                                        324/426
6,472,879 B2 * 10/2002  Park ................... G01R 31/3648
                                                        324/426

(Continued)

FOREIGN PATENT DOCUMENTS

CN      102035053 B  *  5/2013
EP      0179985 A2  *  5/1986

(Continued)

*Primary Examiner* — Chico A Foxx
(74) *Attorney, Agent, or Firm* — Slater Matsil, LLP

(57) ABSTRACT

An embodiment method for controlling a vehicle includes receiving state information of the vehicle and state information of a battery, identifying a present state of charge of the battery and calculating a preset reference value of the battery based on the state information of the vehicle and the state information of the battery, and displaying a message based on a difference between the present state of charge of the battery and the preset reference value of the battery.

20 Claims, 3 Drawing Sheets

(56) References Cited

U.S. PATENT DOCUMENTS

| | | | | |
|---|---|---|---|---|
| 6,501,250 B2* | 12/2002 | Bito | ................ | B60L 58/10 |
| | | | | 320/152 |
| 7,679,329 B2* | 3/2010 | Lim | ................ | B60L 58/33 |
| | | | | 320/132 |
| 8,036,839 B2* | 10/2011 | Machiyama | ........ | H01M 10/486 |
| | | | | 320/136 |
| 8,054,039 B2* | 11/2011 | Bauerle | ................ | B60L 53/305 |
| | | | | 320/109 |
| 9,346,423 B2* | 5/2016 | Yamazaki | ................ | F02N 11/04 |
| 9,853,470 B2* | 12/2017 | Hatsumi | ................ | B60L 3/0046 |
| 10,011,187 B2* | 7/2018 | Cha | ................ | G07C 5/008 |
| 10,173,528 B2* | 1/2019 | Gromotka | ................ | B60K 35/00 |
| 10,190,518 B2* | 1/2019 | Ito | ................ | G01R 31/54 |
| 11,117,489 B2* | 9/2021 | Soeda | ................ | G07C 5/0825 |
| 11,345,329 B2* | 5/2022 | Baumer | ................ | B60W 50/082 |
| 11,368,028 B2* | 6/2022 | Singh | ................ | B60L 53/665 |
| 2009/0088994 A1* | 4/2009 | Machiyama | ........ | H01M 10/486 |
| | | | | 702/63 |
| 2012/0200298 A1* | 8/2012 | Zhang | ................ | G01R 31/3835 |
| | | | | 324/427 |
| 2013/0293007 A1* | 11/2013 | Tagami | ................ | B60L 50/15 |
| | | | | 307/10.1 |
| 2015/0212161 A1* | 7/2015 | Soga | ................ | G01R 31/371 |
| | | | | 702/63 |
| 2017/0274793 A1* | 9/2017 | Ishibashi | ................ | B60L 58/13 |
| 2018/0236898 A1* | 8/2018 | Ji | ................ | B60L 58/12 |
| 2018/0340980 A1* | 11/2018 | Roettinger | ................ | G01R 31/392 |
| 2019/0176640 A1* | 6/2019 | Lee | ................ | B60K 35/00 |
| 2019/0393451 A1* | 12/2019 | Ishihara | ................ | H01M 10/613 |
| 2021/0053439 A1* | 2/2021 | Kazuno | ................ | G06F 3/14 |
| 2022/0055497 A1* | 2/2022 | Yamanaka | ................ | H02J 7/0047 |
| 2022/0097557 A1* | 3/2022 | Lee | ................ | B60K 35/00 |

FOREIGN PATENT DOCUMENTS

| | | | | |
|---|---|---|---|---|
| EP | 1961621 A1 * | 8/2008 | ............ | G01R 31/379 |
| EP | 2778701 A1 * | 9/2014 | ............ | F02N 11/0862 |
| JP | 2004147460 A * | 5/2004 | ............ | B60L 1/003 |

* cited by examiner

FIG. 3

| CLASSIFICATION | | SoH | | | | |
|---|---|---|---|---|---|---|
| | | 50% | 60% | 70% | 90% | 100% |
| LIQUID TEMPERATURE OF BATTERY | -30 °C | 90 | 80 | 75 | 70 | 70 |
| | -20 °C | 80 | 75 | 70 | 65 | 65 |
| | -10 °C | 75 | 70 | 65 | 65 | 60 |
| | 0 °C | 70 | 65 | 65 | 60 | 55 |
| | 10 °C | 65 | 65 | 60 | 55 | 50 |
| | 30 °C | 60 | 60 | 55 | 40 | 40 |
| | 50 °C | 55 | 55 | 40 | 40 | 40 |
| | 70 °C | 40 | 40 | 40 | 40 | 40 |

VEHICLE AND METHOD OF CONTROLLING THE SAME

CROSS-REFERENCE TO RELATED APPLICATIONS

This application claims the benefit of Korean Patent Application No. 10-2020-0146597, filed on Nov. 5, 2020 in the Korean Intellectual Property Office, which application is hereby incorporated herein by reference.

TECHNICAL FIELD

The present disclosure relates to a vehicle and a method of controlling the same.

BACKGROUND

As electric components of a vehicle increase, the importance of managing the battery for supplying electric power to the electric elements is also increasing.

Since if a state of charge of the battery is insufficient, it may not be possible to supply sufficient power to the electronic elements, but also may cause the engine to be unable to start, the management of the state of charge of the battery is very important in operating the vehicle.

In the conventional case, a warning light to warn of battery discharge is only turned on when it falls below a predetermined certain state of charge while monitoring the state of charge of the battery, so it is difficult for the driver to prepare in advance for a decrease in the state of charge of the battery.

SUMMARY

The present disclosure relates to a vehicle and a method of controlling the same. Particular embodiments relate to a vehicle and to battery management of the vehicle.

One embodiment of the disclosed invention is to allow a driver to prepare in advance for a change in the charge amount of the battery by comparing a state of charge of the battery with a predetermined reference value and outputting an alarm message step by step.

It is one embodiment of the disclosure to provide a method of controlling a vehicle, the method including receiving state information of a vehicle and state information of a battery, identifying a state of charge of the battery and calculating a preset reference value of the battery based on the state information of the vehicle and the state information of the battery, and displaying an alarm message of the battery according to a difference between a present state of charge of the battery and the preset reference value of the battery.

In the control method of the vehicle described above, in response to a difference between the present state of charge of the battery and the preset reference value of the battery being greater than a preset first value, information indicating a present state of the battery is only displayed.

In the control method of the vehicle described above, the information indicating the present state of the battery includes a usage graph of the battery, a usable time, and a usable time up to the reference value.

In the control method of the vehicle described above, in response to the difference between the present state of charge of the battery and the preset reference value of the battery being greater than a preset second value smaller than the first value and being less than or equal to the first value, the information indicating the present state of the battery is displayed and a preset first alarm message is displayed.

In the control method of the vehicle described above, the first alarm message is a caution message for inducing a driver of the vehicle to be interested in the state of the battery.

In the control method of the vehicle described above, in response to the difference between the present state of charge of the battery and the preset reference value of the battery being greater than a third preset value smaller than the second value and being less than or equal to the second value, the information indicating the present state of the battery is displayed and a preset second alarm message is displayed.

In the control method of the vehicle described above, the second alarm message is a warning message for inducing the driver of the vehicle to continuously pay attention to the state of the battery.

In the control method of the vehicle described above, in response to the difference between the present state of charge of the battery and the preset reference value of the battery being less than or equal to the third value, the information indicating the present state of the battery is displayed and power supply from the battery is cut off.

In the control method of the vehicle described above, a message is displayed to inform that the power supply is cut off before the power supply is cut off.

Another embodiment of the disclosure provides a method of controlling a vehicle including a battery management system provided to obtain state information of a battery, and a controller configured to receive state information of the vehicle and state information of the battery, identify a state of charge of the battery and calculate a preset reference value of the battery based on the state information of the vehicle and the state information of the battery, and display an alarm message of the battery according to a difference between a present state of charge of the battery and the preset reference value of the battery.

In the vehicle described above, in response to the difference between the present state of charge of the battery and the preset reference value of the battery being greater than a preset first value, the controller displays only information indicating a present state of the battery.

In the vehicle described above, the information indicating the present state of the battery includes a usage graph of the battery, a usable time, and a usable time up to the reference value.

In the vehicle described above, in response to the difference between the present state of charge of the battery and the preset reference value of the battery being greater than a preset second value smaller than the first value and being less than or equal to the first value, the controller is configured to display information indicating the present state of the battery and display a preset first alarm message.

In the vehicle described above, the first alarm message is a caution message for inducing a driver of the vehicle to be interested in the state of the battery.

In the vehicle described above, in response to the difference between the present state of charge of the battery and the preset reference value of the battery being greater than a third preset value smaller than the second value and being less than or equal to the second value, the controller is configured to display the information indicating the present state of the battery and display a preset second alarm message.

In the vehicle described above, the second alarm message is a warning message for inducing the driver of the vehicle to continuously pay attention to the state of the battery.

In the vehicle described above, in response to the difference between the present state of charge of the battery and the preset reference value of the battery being less than or equal to the third value, the controller is configured to display the information indicating the present state of the battery and cut off power supply from the battery.

In the vehicle described above, the controller is configured to display a message to inform that the power supply is cut off before the power supply is cut off.

BRIEF DESCRIPTION OF THE DRAWINGS

These and/or other embodiments of the present invention will become apparent and more readily appreciated from the following description of exemplary embodiments, taken in conjunction with the accompanying drawings, in which:

FIG. 3 is a view illustrating an example of a battery management standard of a vehicle control method according to an embodiment of the present disclosure.

DETAILED DESCRIPTION OF ILLUSTRATIVE EMBODIMENTS

Figure 1:
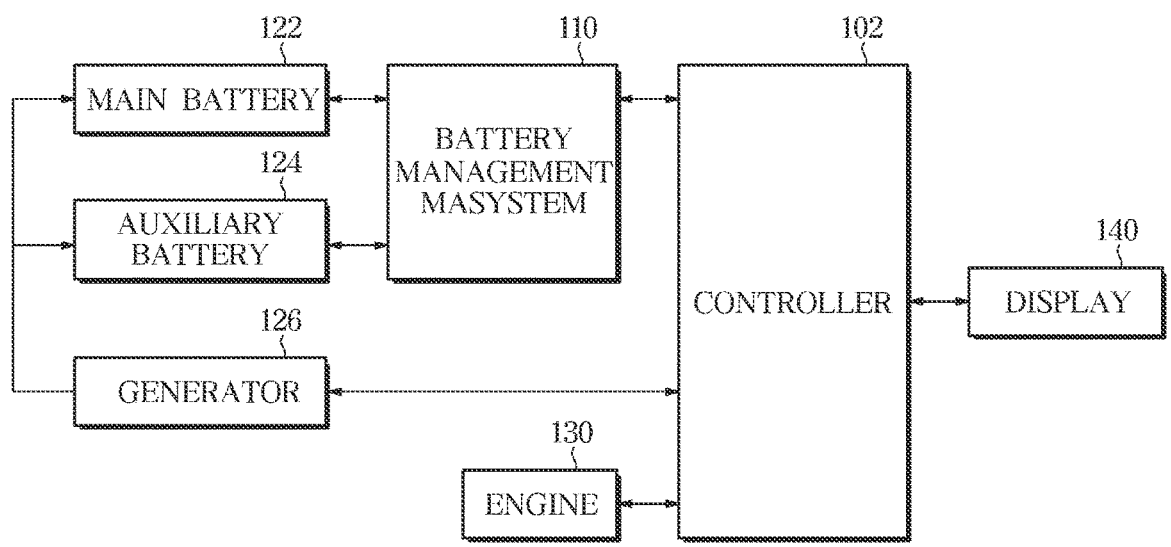
FIG. 1 is a view illustrating a control system of a vehicle according to an embodiment of the present disclosure.

Like numerals refer to like elements throughout the specification. Not all elements of embodiments of the present invention will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, identify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it will be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present invention will be described with reference to the accompanying drawings.

FIG. 1 is a view illustrating a control system of a vehicle according to an embodiment of the present disclosure.

As shown in FIG. 1, a controller 102 monitors a state of batteries 122 and 124 mounted in the vehicle, and displays a guide message indicating the state of the batteries 122 and 124 step by step. Accordingly, a driver of the vehicle may recognize the state of the batteries 122 and 124 in advance step by step before discharging.

To this end, a battery management system (BMS) 110 monitors the state of a main battery 122 and an auxiliary battery 124, and provides state information of the batteries 122 and 124 to the controller 102 as a monitoring result. The state information of the batteries 122 and 124 may include current and liquid temperature of each of the batteries 122 and 124, state of health (SOH), state of charge (SOC), and internal resistance.

The main battery 122 and the auxiliary battery 124 constitute a dual power supply. That is, the controller 102 generates a relatively high voltage and a low voltage through two batteries, the main battery 122 and the auxiliary battery 124, and controls the battery management system 110 so that high voltage power or low voltage power is supplied as needed to each electronic element. According to the need, only one of the main battery 122 and the auxiliary battery 124 may be used as a single power source.

A generator 126 is provided to charge the main battery 122 and the auxiliary battery 124 through power generation. State information indicating whether the generator 126 is operating is provided to the controller 102. The controller 102 may identify whether the generator 126 operates based on the state information received from the generator 126.

An engine 130 is provided to provide power to the vehicle. Status information of the engine 130 is provided to the controller 102. The state information of the engine 130 provided to the controller 102 includes information indicating 'IG ON state' and 'ACC state'. The controller 102 identifies whether the vehicle is in a parking standby mode from the state information of the engine 130. The parking standby mode means a state in which the engine 130 of the vehicle is in the IG ON state and the generator 126 is not operated.

In response to the state of the batteries 122 and 124 being identified, the controller 102 displays the state information of the batteries 122 and 124 through a display 140, and also displays a predetermined guide message (warning message) to correspond to the state of the batteries 122 and 124 through the display 140.

Figure 2:
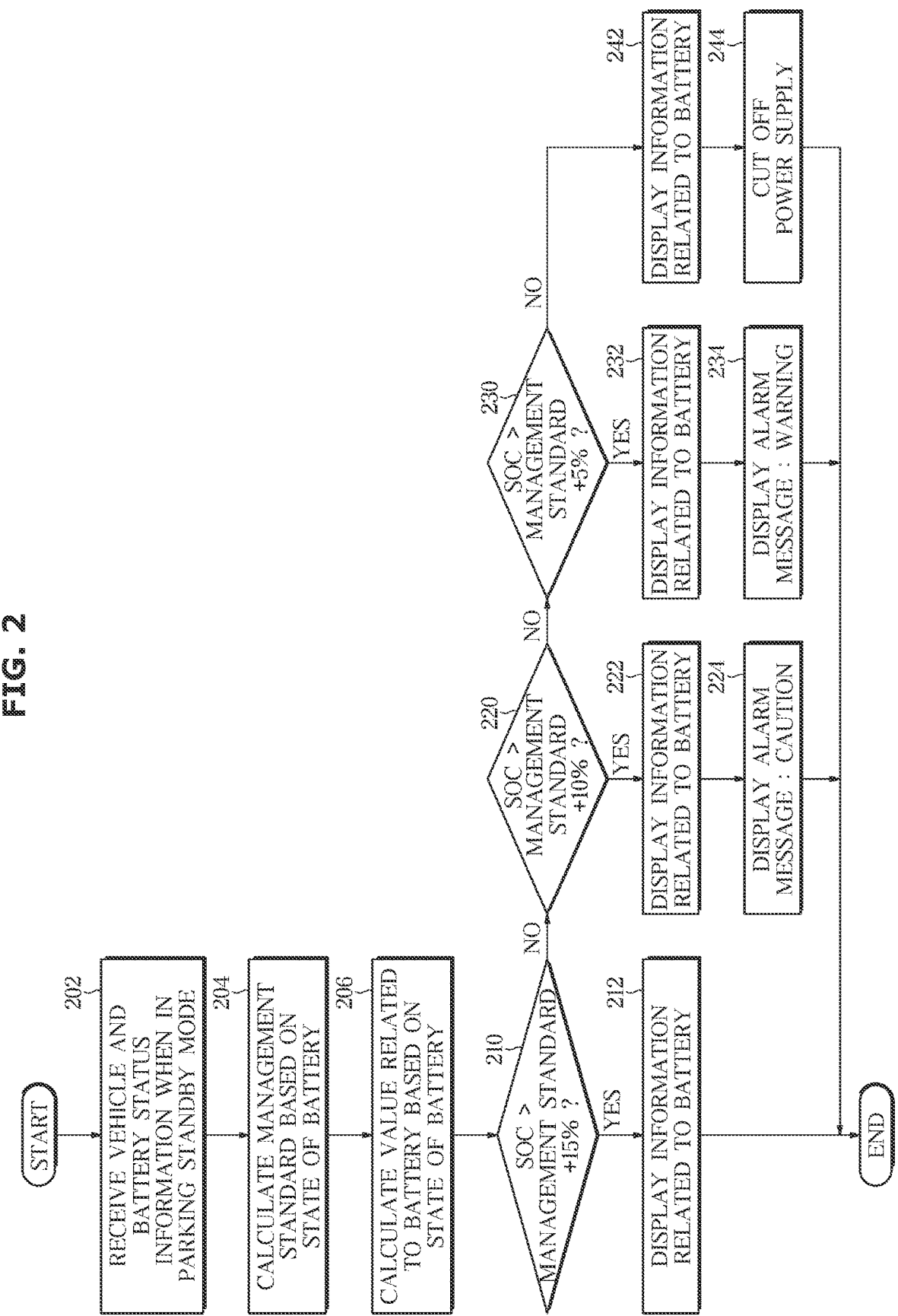
FIG. 2 is a view illustrating a control method of a vehicle according to an embodiment of the present disclosure.

FIG. 2 is a view illustrating a control method of a vehicle according to an embodiment of the present disclosure. The vehicle control method of FIG. 2 operates based on the device configuration of FIG. 1.

As shown in FIG. 2, the controller 102 receives state information of the vehicle and state information of the batteries 122 and 124 in response to the vehicle being in the parking standby mode (202). The state information of the vehicle may include state information indicating whether or not the generator 126 operates, and temperature outside the vehicle. The state information of the batteries 122 and 124 may include current and liquid temperature of each of the batteries 122 and 124, state of health (SOH), state of charge (SOC), and internal resistance.

Subsequently, the controller 102 sets a management standard based on the state of the batteries 122 and 124 (204). A management standard is a standard for generating an alarm to notify the driver in response to the state of the batteries 122 and 124 being a state that requires attention and interest of the driver.

For example, the controller 102 may set the management standard based on the liquid temperature and the state of health (SOH) of the batteries 122 and 124.

FIG. 3 is a view illustrating an example of a battery management standard of a vehicle control method according to an embodiment of the present disclosure. As shown in FIG. 3, points are given according to the respective values of the liquid temperature and the state of health (SOH) of the batteries 122 and 124. For example, the lower the liquid temperature of the batteries 122 and 124 and the higher the state of health (SOH), the greater the management standard. Conversely, the higher the liquid temperature of the batteries 122 and 124 and the lower the state of health (SOH), the smaller the management standard.

Returning to FIG. 2, the controller 102 identifies the state of the batteries 122 and 124 and calculates various values related to the batteries 122 and 124 based on the state information of the batteries 122 and 124 (206). The values calculated at this time may include 'available time' and 'usage' of the batteries 122 and 124, 'main battery saving amount (dual power supply)', and 'restartability'.

Calculation of values related to the state of the batteries 122 and 124 may be performed in different ways depending on whether both batteries 122 and 124 are used (dual power) or only one main battery 122 is used. In the case of using dual power, the 'available time' and 'usage' of the aforementioned batteries 122 and 124, 'main battery saving amount (dual power)', and 'restartability' are all calculated. Unlike this, in the case of only using the main battery 122, only the 'available time' and 'usage' of the batteries 122 and 124, and 'restartability' are calculated. That is, in the case of only using the main battery 122, there is no need to calculate the 'main battery saving amount (dual power supply)'. 'Available time', 'usage', 'main battery saving amount (dual power)', and 'restartability' can be calculated as follows, respectively.

(i) Available Time=(Present SOC−Management standard)/Current Filter Value (ii) Usage=Accumulated amount of each main battery and auxiliary battery (accumulated amount of auxiliary battery is calculated only during dual power supply)

(iii) Main battery saving amount=Accumulation of main battery−Accumulation of auxiliary battery (main battery saving amount is calculated only during dual power supply)

(iv) Restartability=$f$(SOC, Liquid Temperature, SOH)

Here, the 'restartability' of the engine 130 means whether the engine 130 may be restarted with a present state of the batteries 122 and 124, and is calculated by substituting the present state of charge (SOC), the liquid temperature, and the state of health (SOH) of the batteries 122 and 124 into a predefined function.

In response to this calculation being completed, the controller 102 identifies how much the state of charge (SOC) of the battery exceeds a preset management standard (210 to 230). The preset management standard may be defined as the minimum value that the driver should pay attention to and requires interest in the state of the batteries 122 and 124 of the vehicle. For example, the preset management standard may be defined based on the total amount of electric power consumed by the vehicle's electric components per unit time.

In response to the state of charge (SOC) of the batteries 122 and 124 being greater than the preset management standard by 15% or more ('Yes' of 210), the controller 102 displays information related to the present state of the batteries 122 and 124 through the display 140 (212). At this time, the information related to the present state of the batteries 122 and 124 displayed through the display 140 includes a graph of usage, available time, available time to management standard, and the like of the batteries 122 and 124. However, since the state of charge (SOC) of the batteries 122 and 124 exceeds the preset management standard by 15% or more, the driver only refers to the state of the batteries 122 and 124, and there is no need to display a specific alarm or to perform a control of the batteries 122 and 124.

In response to the state of charge (SOC) of the batteries 122 and 124 being greater than the preset management standard by 10% or more ('Yes' of 220), the controller 102 displays information related to the present state of the batteries 122 and 124 through the display 140 (222). At this time, the information related to the present state of the batteries 122 and 124 displayed through the display 140 includes a graph of usage, available time, available time to management standard, and the like of the batteries 122 and 124. In addition, the controller 102 displays through the display 140 that the present state of charge (SOC) of the batteries 122 and 124 is 'management standard+10% or more (15% or less)'. In addition, the controller 102 induces the driver to be interested to the state of the batteries 122 and 124 by displaying a 'caution message' through the display 140 (224).

In response to the state of charge (SOC) of the batteries 122 and 124 being greater than the preset management standard by 5% or more ('Yes' of 230), the controller 102 displays information related to the present state of the batteries 122 and 124 through the display 140 (232). At this time, the information related to the present state of the batteries 122 and 124 displayed through the display 140 includes a graph of usage, available time, available time to management standard, and the like of the batteries 122 and 124. In addition, the controller 102 displays through the display 140 that the present state of charge (SOC) of the batteries 122 and 124 is 'management standard+5% or more (10% or less)'. In addition, the controller 102 induces the driver to continuously pay attention to the state of the batteries 122 and 124 by displaying a 'warning message' through the display 140 (234).

In response to the state of charge (SOC) of the batteries 122 and 124 being greater than the preset management standard by 5% or less ('No' of 230), the controller 102 displays information related to the present state of the batteries 122 and 124 through the display 140 (242). At this time, the controller 102 displays the present state of charge (SOC) of the batteries 122 and 124 through the display 140 'management standard+5% or less'. In addition, the controller 102 cuts off power supply from the batteries 122 and 124 so that the power of the batteries 122 and 124 is not consumed (244).

However, in this case, it is preferable that the controller 102 informs that the power supply may be cut off soon through the display 140 before cutting off the power supply from the batteries 122 and 124, and enables the driver to prepare in advance for the cut off of the power supply.

As is apparent from the above, according to an embodiment of the present invention, by comparing the charge amount of the battery with a predetermined reference value and outputting the warning message in stages, the driver can prepare in advance for a change in the state of charge of the battery.

Although exemplary embodiments of the present invention have been described for illustrative purposes, those skilled in the art will appreciate that various modifications, additions and substitutions are possible, without departing from the scope and spirit of the present invention. Therefore, exemplary embodiments of the present invention have not been described for limiting purposes.

What is claimed is:

1. A method for controlling a vehicle, the method comprising:
receiving present state of charge information of a battery and state information of the battery;
calculating a preset reference value of the battery based on the state information of the battery; and
displaying one of a plurality of messages regarding the present state of charge of the battery based on a difference between the present state of charge of the battery and the preset reference value of the battery;
wherein the difference between the present state of charge of the battery and the preset reference value of the battery is divided into a plurality of ranges including a first range that is greater than a first preset value, a second range that is less than or equal to the first preset value and greater than a second preset value, and a third range that is less than or equal to the second preset value and greater than a third preset value; and
wherein displaying one of the plurality of messages comprises displaying a message based on the difference between the present state of charge of the battery and the preset reference value of the battery.

2. The method according to claim 1, wherein, in response to the difference between the present state of charge of the battery and the preset reference value of the battery being greater than the first preset value, the one of the plurality of messages being displayed comprises information indicating the present state of charge of the battery without an alarm message.

3. The method according to claim 2, wherein the information indicating the present state of the battery comprises a usage graph of the battery, a usable time, and a usable time up to the preset reference value.

4. The method according to claim 1, wherein in response to the difference between the present state of charge of the battery and the preset reference value of the battery being greater than the second preset value and less than or equal to the first preset value, the one of the plurality of messages being displayed comprises the information indicating the present state of charge of the battery and a preset first alarm message, wherein the preset first alarm message is a caution message to induce a driver of the vehicle to notice the state of the battery.

5. The method according to claim 1, wherein in response to the difference between the present state of charge of the battery and the preset reference value of the battery being greater than the third preset value and less than or equal to the second preset value, the one of the plurality of messages being displayed comprises the information indicating the present state of charge of the battery and a preset second alarm message, wherein the preset second alarm message is a warning message to induce a driver of the vehicle to continuously notice the state of the battery.

6. The method according to claim 1, wherein in response to the difference between the present state of charge of the battery and the preset reference value of the battery being less than or equal to the third preset value, the method further comprises cutting off power supply from the battery.

7. The method according to claim 1, wherein:
the state information of the battery further includes liquid temperature of the battery and state of health (SOH) information of the battery; and
the preset reference value of the battery is calculated based on the liquid temperature of the battery and the state of health (SOH) information of the battery.

8. The method according to claim 7, wherein:
the preset reference value is larger when the liquid temperature of the battery is lower and the state of health (SOH) of the battery is higher; and
the preset reference value is smaller when the liquid temperature of the battery is higher and the state of health (SOH) of the battery is lower.

9. A vehicle comprising:
a battery management system configured to obtain present state of charge information of a battery and state information of the battery; and
a controller configured to:
receive the present state of charge information of the battery and the state information of the battery;
calculate a preset reference value of the battery based on the state information of the vehicle and the state information of the battery; and
display one of a plurality of messages regarding the present state of charge of the battery based on a difference between the present state of charge of the battery and the preset reference value of the battery,
wherein the difference between the present state of charge of the battery and the preset reference value of the battery is divided into a range that is greater than a first preset value, a range that is less than or equal to the first preset value and greater than a second preset value, and a range that is less than or equal to the second preset value and greater than a third preset value; and
wherein the one of the plurality of messages being displaying is based on the difference between the present state of charge of the battery and the preset reference value of the battery.

10. The vehicle according to claim 9, wherein, in response to the difference between the present state of charge of the battery and the preset reference value of the battery being greater than the first preset value, the controller is configured to display the one of the plurality of messages comprising information indicating the present state of charge of the battery without an alarm message.

11. The vehicle according to claim 10, wherein the information indicating the present state of the battery comprises a usage graph of the battery, a usable time, and a usable time up to the preset reference value.

12. The vehicle according to claim 10, wherein, in response to the difference between the present state of charge of the battery and the preset reference value of the battery being greater than the second preset value and less than or equal to the first preset value, the controller is configured to display the one of the plurality of messages comprising the information indicating the present state of charge of the battery and a preset first alarm message, wherein the preset first alarm message is a caution message configured to induce a driver of the vehicle to notice the state of the battery.

13. The vehicle according to claim 12, wherein, in response to the difference between the present state of charge of the battery and the preset reference value of the battery being greater than a third preset value and less than or equal to the second preset value, the controller is configured to display the one of the plurality of messages comprising the information indicating the present state of charge of the battery and a preset second alarm message, wherein the preset second alarm message is a warning message configured to induce a driver of the vehicle to continuously notice the state of the battery.

14. The vehicle according to claim 13, wherein in response to the difference between the present state of charge of the battery and the preset reference value of the battery being less than or equal to the third preset value, the controller is configured to:
display one of the plurality of messages comprising the information indicating the present state of charge of the battery;
display an additional message to inform a driver of the vehicle that power supply is to be cut off before the power supply is cut off; and
cut off the power supply from the battery.

15. The vehicle according to claim 9, wherein:
the state information of the battery further includes liquid temperature of the battery and state of health (SOH) information of the battery; and
the preset reference value of the battery is calculated based on the liquid temperature of the battery and the state of health (SOH) information of the battery.

16. The vehicle according to claim 15, wherein:
the preset reference value is larger when the liquid temperature of the battery is lower and the state of health (SOH) of the battery is higher; and
the preset reference value is smaller when the liquid temperature of the battery is higher and the state of health (SOH) of the battery is lower.

17. A method comprising:
receiving state information of a vehicle and state information of a battery;
identifying a present state of charge of the battery and calculating a preset reference value of the battery based on the state information of the vehicle and the state information of the battery;
displaying information indicating a present state of the battery, wherein the information indicating the present state of the battery comprises a usage graph of the battery, a usable time, and a usable time up to the preset reference value;
displaying a first preset alarm message in response to a difference between the present state of charge of the battery and the preset reference value of the battery being greater than a second preset value smaller than a first preset value and being less than or equal to the first preset value; and
displaying a second preset alarm message in response to the difference between the present state of charge of the battery and the preset reference value of the battery being greater than a third preset value smaller than the second preset value and being less than or equal to the second preset value.

18. The method according to claim 17, further comprising cutting off power supply from the battery in response to the difference between the present state of charge of the battery and the preset reference value of the battery being less than or equal to the third preset value.

19. The method according to claim 17, wherein:
the state information of the battery further includes liquid temperature of the battery and state of health (SOH) information of the battery; and
the preset reference value of the battery is calculated based on the liquid temperature of the battery and the state of health (SOH) information of the battery.

20. The method according to claim 19, wherein:
the preset reference value is larger when the liquid temperature of the battery is lower and the state of health (SOH) of the battery is higher; and
the preset reference value is smaller when the liquid temperature of the battery is higher and the state of health (SOH) of the battery is lower.

* * * * *